US007305501B2

(12) United States Patent
Lee

(10) Patent No.: US 7,305,501 B2
(45) Date of Patent: Dec. 4, 2007

(54) PORTABLE COMPUTER SYSTEM HAVING LCD MONITOR FOR SELECTIVELY RECEIVING VIDEO SIGNALS FROM EXTERNAL VIDEO SIGNAL INPUT FROM EXTERNAL COMPUTER

(75) Inventor: Cheon-Moo Lee, Yongin (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 941 days.

(21) Appl. No.: 10/113,999

(22) Filed: Apr. 3, 2002

(65) Prior Publication Data

US 2003/0014576 A1    Jan. 16, 2003

(30) Foreign Application Priority Data

Jul. 10, 2001    (KR) ............................... 2001-41226

(51) Int. Cl.
*G06F 13/00* (2006.01)
*H04N 7/00* (2006.01)
*G09G 5/00* (2006.01)

(52) U.S. Cl. ........................... 710/62; 710/38; 710/60; 710/61; 710/34; 348/552; 345/3; 345/501; 345/596; 345/1

(58) Field of Classification Search ............ 710/60–62, 710/34, 38; 345/3.1, 31, 501, 596; 708/141; 348/552
See application file for complete search history.

(56) References Cited

U.S. PATENT DOCUMENTS 5,305,244 A * 4/1994 Newman et al. ............ 708/141
5,929,924 A * 7/1999 Chen .......................... 348/552
5,948,047 A * 9/1999 Jenkins et al. .............. 708/141
6,020,863 A * 2/2000 Taylor ......................... 345/3.1
6,023,266 A * 2/2000 Eglit et al. .................. 345/555
6,097,441 A * 8/2000 Allport ....................... 348/552
6,118,413 A * 9/2000 Bril et al. ................... 345/596

(Continued)

FOREIGN PATENT DOCUMENTS

JP            07-191821       7/1995

(Continued)

OTHER PUBLICATIONS

Andrew Tanenbaum, Structured Computer Organization 3rd, 1990, Prentice-Hall, Inc., pp. 11-13.*

(Continued)

*Primary Examiner*—Tammara Peyton
(74) *Attorney, Agent, or Firm*—Robert E. Bushnell, Esq.

(57) ABSTRACT

A portable computer system includes a portable computer equipped with a graphic chip, and an LCD monitor receiving a video signal from the graphic chip and displaying the video signal. The portable computer system further includes an external video signal input part provided at the portable computer and receiving an external video signal from an external computer, an A/D converter provided at the portable computer and converting the external video signal inputted through the external video signal input part into a digital signal, and a control part controlling the video signal and the digital signal from the graphic chip and the A/D converter to be outputted to the LCD monitor. With this configuration, the present invention provides a portable computer system enhancing the utility of the LCD monitor by receiving an external video signal from an external computer and displaying it on an LCD monitor.

25 Claims, 5 Drawing Sheets

U.S. PATENT DOCUMENTS

| | | | |
|---|---|---|---|
| 6,166,734 A * | 12/2000 | Nahi et al. | 715/748 |
| 6,177,946 B1 * | 1/2001 | Sinclair et al. | 345/501 |
| 6,538,880 B1 * | 3/2003 | Kamijo et al. | 361/686 |
| 6,556,219 B1 * | 4/2003 | Wugofski | 345/762 |
| 6,707,434 B1 * | 3/2004 | Wilson | 345/1.1 |
| 6,873,306 B2 * | 3/2005 | Hansen et al. | 345/1.2 |
| 2003/0137469 A1 * | 7/2003 | Hansen et al. | 345/3.1 |
| 2004/0043657 A1 * | 3/2004 | Helot et al. | 439/535 |

FOREIGN PATENT DOCUMENTS

| | | |
|---|---|---|
| JP | 07-295685 | 11/1995 |
| KR | 1992-22907 | 12/1992 |
| KR | 1995-20038 | 7/1995 |
| KR | 2000-11182 | 6/2000 |
| KR | 2000-11676 | 7/2000 |

OTHER PUBLICATIONS

Microsoft Computer Dictionary, 1999, Microsoft Corporation, 4th Edition, pp. 102, 294, 299, 408.*

Merriam-Webster's Collegiate Dictionary, Merriam-Webster Inc, 1998, 10th Edition, pp. 907.*

* cited by examiner

PORTABLE COMPUTER SYSTEM HAVING LCD MONITOR FOR SELECTIVELY RECEIVING VIDEO SIGNALS FROM EXTERNAL VIDEO SIGNAL INPUT FROM EXTERNAL COMPUTER

CLAIM OF PRIORITY

This application makes reference to, incorporates the same herein, and claims all benefits accruing under 35 U.S.C. § 119 from my application for PORTABLE COMPUTER AND METHOD FOR REPRODUCING VIDEO SIGNAL ONSCREEN THEREOF filed with the Korean Industrial Property Office on Jul. 10, 2001 and there duly assigned Serial No. 41226/2001.

BACKGROUND OF THE INVENTION

1. Technical Field

The present invention relates in general to a portable computer system, and more particularly, to a portable computer system displaying a video signal inputted from an external computer system on a liquid crystal display (LCD) monitor, thereby enhancing the utility of the LCD monitor.

2. Description of the Background Art

A portable computer system has mobility and simplicity compared with a desktop computer system. The portable computer system includes a laptop computer, a notebook computer, a palmtop computer, etc.

Generally, the desktop computer system employs a cathode-ray tube (CRT) monitor as a display apparatus, but recently, an LCD monitor has been widely employed as a display apparatus.

The portable computer employs the LCD monitor as a display apparatus because the LCD monitor is smaller and lighter than the CRT monitor.

There is a desktop computer system having the CRT monitor incorporated with a computer, but in most of the desktop computer systems, the CRT monitor is separated from the computer. Thus, the computer transmits a CRT video signal to a CRT port, and the CRT monitor receives the CRT video signal inputted through the CRT port, thereby displaying the video signal on a screen.

In the desktop computer system, because the CRT monitor is separated from the computer, the CRT monitor may be connected to any one of a plurality of computers as necessary. That is, while the CRT monitor displays a video signal inputted from a first computer connected thereto, if the CRT monitor is separated from the first computer and connected to a second computer, the CRT monitor displays a video signal inputted from the second computer connected thereto.

Recently, the LCD monitor for the desktop computer system is connected to the CRT port and is separable from the computer, like the CRT monitor. Thus, because the LCD monitor for the desktop computer system is connected to the CRT port of a first computer by means of a cable, the LCD monitor for the desktop computer system can be used for displaying a CRT video signal inputted from a second computer by connecting the cable to the second computer.

However, the LCD monitor for the portable computer system is incorporated with the computer in one body, so that the LCD monitor for the portable computer system can display only one video signal inputted from the computer incorporated therewith. That is, the LCD monitor for the portable computer system cannot display a CRT video signal inputted from an external computer, unlike the desktop computer system.

If the CRT video signal inputted from the desktop computer is displayed on the LCD monitor of the portable computer system, the utility of the LCD monitor for the portable computer system is enhanced. Moreover, it need not employ an additional monitor for the desktop computer system, thereby enhancing a space efficiency.

SUMMARY OF THE INVENTION

It is therefore an object of the present invention is to provide a portable computer system in which an LCD monitor is shared with a desktop computer system, thereby enhancing the utility thereof and a space efficiency.

It is another object to have a portable computer system in which an LCD monitor is shared with a desktop computer system that is easy and inexpensive to implement.

It is another object to selectively view the output of two computer units at the same time or separately on the same monitor, where the monitor is integrated with one of the two computer systems.

It is another object to reduce the amount of connections needed in order to have the desktop output video be viewed on the portable computer display.

To accomplish the above and other objects, a portable computer system includes a portable computer equipped with a graphic chip, and an LCD monitor receiving a video signal from the graphic chip and displaying the video signal. The portable computer system further includes an external video signal input part provided at the portable computer and receiving an external video signal from an external computer, an analog to digital (A/D) converter provided at the portable computer and converting the external video signal inputted through the external video signal input part into a digital signal, and a control part controlling the video signal and the digital signal from the graphic chip and the A/D converter to be selectively outputted to the LCD monitor.

Preferably, the portable computer system further includes a main board on which the graphic chip is mounted, and where the control part is comprised of a video multiplexer (MUX) provided at the main board.

Preferably, the control part outputs both the video and digital signals respectively received from the graphic chip and the A/D converter to the LCD monitor.

According to another aspect of the present invention, the above and other objects may be also achieved by the provision of a display method of a portable computer system including a portable computer equipped with a graphic chip, and an LCD monitor receiving a video signal from the graphic chip and displaying the video signal, including the steps of preparing an external video signal input part at the portable computer, receiving an external video signal from an external computer, receiving the video signal from the graphic chip, receiving the external video signal from the external computer through the external video signal input part, converting the external video signal received through the external video signal input part into a digital signal, transmitting the video and digital signals to be selectively outputted to the LCD monitor, and displaying the video and digital signals through the LCD monitor.

Herein, the converting step is performed by an A/D converter provided at the portable computer.

Preferably, the transmitting step is performed by a video MUX provided at the portable computer.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF PREFERRED EMBODIMENT

Figure 1:
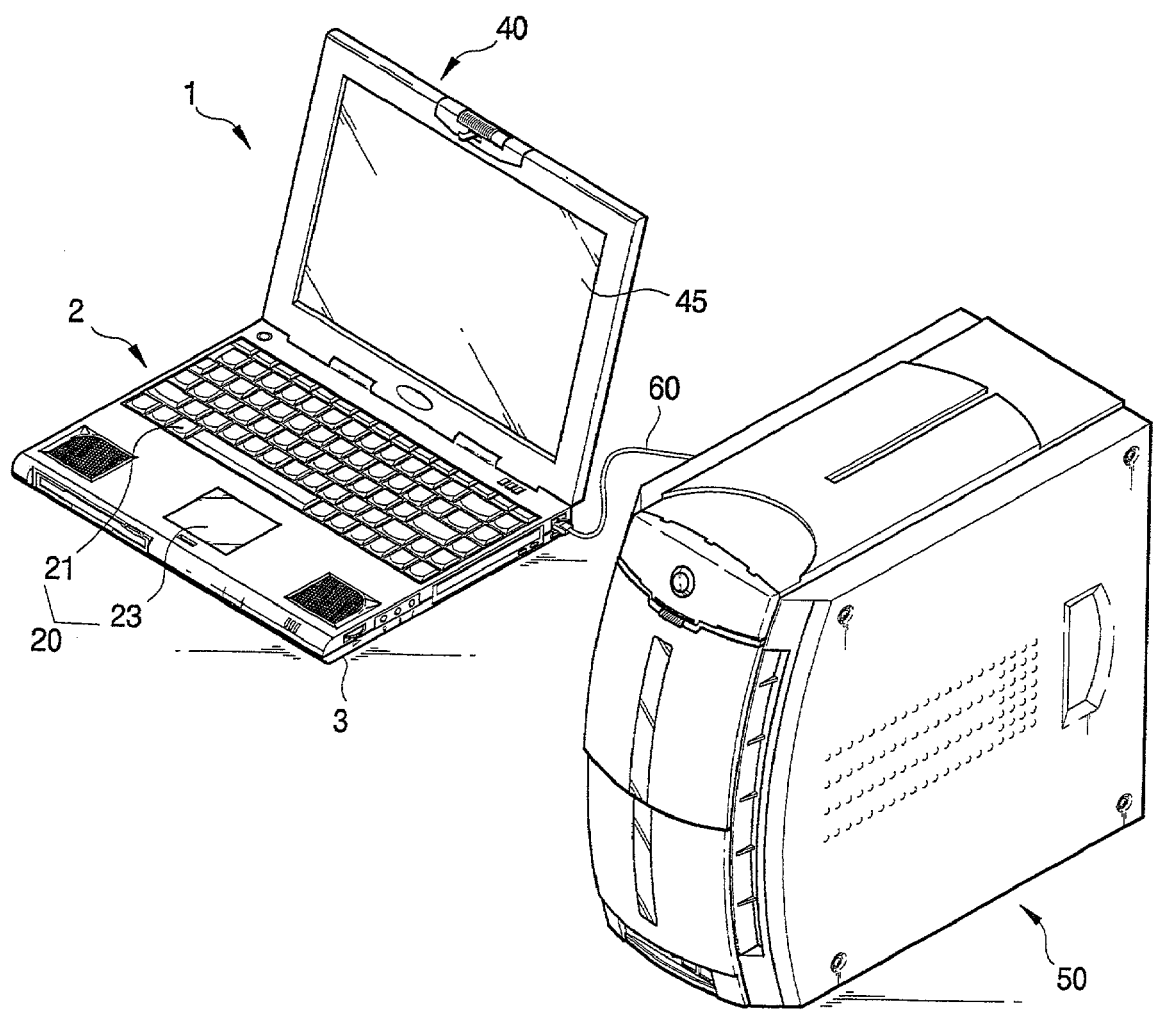
FIG. 1 is a perspective view of a computer system according to the present invention.
Figure 2A:
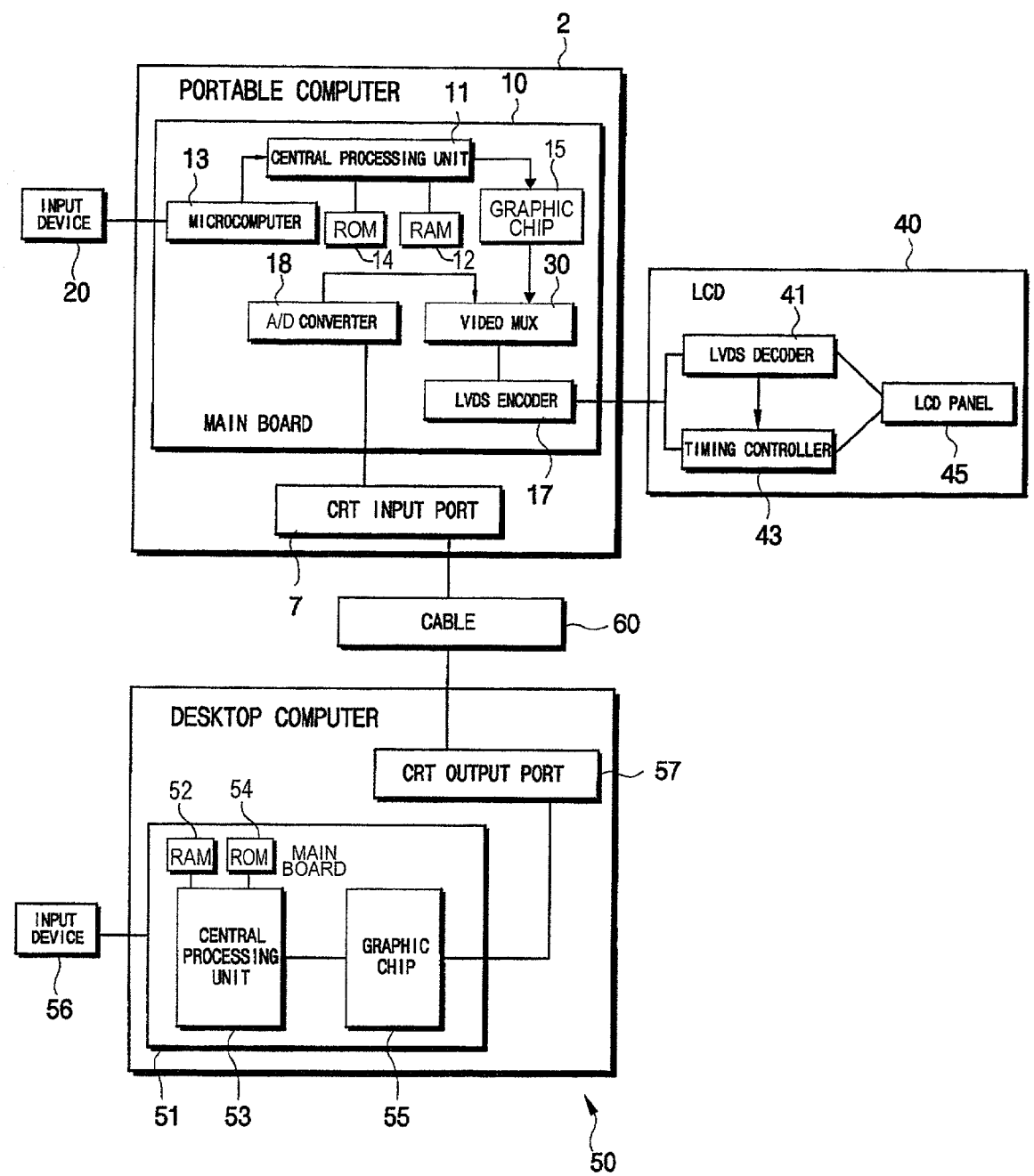
FIGS. 2A through 2C are block diagrams of the computer system according to the present invention.

Turning now to the drawings, referring to FIGS. 1 and 2A, a computer system according to the present invention includes a portable computer system 1 including a portable computer 2 equipped with a plurality of hardware components such as a main board 10, and an LCD monitor 40 displaying a video signal received from the portable computer 2, which is connected to a desktop computer 50 transmitting a CRT video signal to a CRT output port 57.

As shown in FIG. 2A, the desktop computer 50 includes an input device 56 transmitting an inputted signal to the desktop computer 50, a main board 51 on which a central processing unit 53 and a graphic chip 55 generating a CRT video signal as an external video signal is mounted, and the CRT output port 57 receiving and outputting the CRT video signal from the graphic chip 55. The central processing unit 53 can be connected to memory units such as the random-access memory (RAM) 52, read-only memory (ROM) 54 and possibly a storage media such as a hard drive or other type of removable or unremovable storage media.

The CRT video signal generated in the graphic chip 55 and transmitted to the CRT output port 57 is of an analog signal which includes RGB (Red, Green, and Blue) signals, a horizontal synchronous (Hsync) signal and a vertical synchronous (Vsync) signal. In the conventional desktop computer, as described above, the CRT video signal is displayed through a general CRT monitor (not shown) connected to the CRT output port 57.

However, in the computer system according to the present invention, the CRT video signal is displayed on the LCD monitor 40 through a CRT input port 7 (to be described later) which is provided at the portable computer 2 to receive the signal outputted from the CRT output port 57.

As shown in FIGS. 1 and 2A, the portable computer 2 of the portable computer system 1 includes a casing 3 forming an external appearance, a main board 10 provided inside the casing 3 and equipped with a central processing unit 11, a graphic chip 15, and a plurality of hardware components such as a hard disk drive.

At a part of the casing 3 is, as shown in FIG. 2A, provided the CRT input port 7 receiving the CRT video signal outputted from the CRT output port 57 of the desktop computer 50.

As shown in FIGS. 1 and 2A, the CRT input port 7 receives the CRT video signal outputted from the CRT output port 57 through a cable 60, and transmits it to an A/D (Analog to Digital) converter 18 provided at the main board 10.

On the main board 10 are mounted the central processing unit 11 operating application programs and calculations, a microcomputer 13 controlling an input device 20 including a keyboard 21, the graphic chip 15 generating a video signal according to an operation of the central processing unit 11, and the A/D converter 18. The central processing unit 11 can be connected to memory units such as the random-access memory (RAM) 12, read-only memory (ROM) 14 and possibly a storage media such as a hard drive or other type of removable or unremovable storage media.

The microcomputer 13 controls a keyboard controller (not shown) controlling the keyboard 13, a mouse interface (not shown) controlling a touch pad 23 and a mouse (not shown), and then transmits a signal inputted from the keyboard 21 and the mouse to the central processing unit 11.

The A/D converter 18 converts the analog signal (CRT video signal) received through the CRT input port 7 into a digital signal in order to make the analog signal be read and processed at the LCD monitor 40. That is, the analog signal which includes the RGB signals, the Hsync signal, and the Vsync signal is converted into the digital signal which includes the color (RGB) signals, a clock (CLK) signal, and horizontal/vertical synchronous signals, and then transmitted to the LCD monitor via a control part (a video MUX) and an LVDS (Low Voltage Differential Signaling) encoder 17.

The graphic chip 15 mounted on the main board 10 generates the color (RGB) signals, the clock (CLK) signal, and the horizontal/vertical synchronous signals, according to the operations of the central processing unit 11, and then transmits them to the LCD monitor 40 via the control part 30 and the LVDS encoder 17.

The LVDS encoder 17 digitizes the video signal from the graphic chip 15 and the digital signals from the A/D converter 18 again (namely, the color signals, the clock signal, and the horizontal/vertical synchronous signals are reduced in number from twenty to ten), and transmits them to an LVDS decoder 41 in high frequency.

Among the LVDS encoder 17, the graphic chip 15, and the A/D converter 18, there is provided the video MUX (Multiplexer) 30 as the control part. The video MUX 30 transmits the video signal from the graphic chip 15 and the digital signal from the A/D converter 18 to the LVDS encoder 17 and outputs them to the LCD monitor 40.

The video MUX 30 is mounted on the main board 10 as a chip, and transmits several signals through one channel. Thus, the video MUX 30 transmits the video signal received through a channel connected to the graphic chip 15 and the digital signal received through a channel connected to the A/D converter 18 simultaneously, and outputs them to the LCD monitor 40. Herein, when the video signal is not transmitted from the graphic chip 15, the video MUX 30 transmits only the digital signal from the A/D converter 18 to the LVDS encoder 17, thereby outputting it to the LCD monitor 40. Further, when both the video and digital signals are transmitted from the graphic chip 15 and the A/D converter 18, the video MUX 30 selectively outputs the video or digital signal according to control of a user.

The LCD monitor 40 includes an LVDS decoder 41 decoding the signal received from the LVDS encoder 17, a timing controller 43 controlling the video signal decoded by the LVDS decoder 41 to be outputted sequentially, and an LCD panel 45 displaying the video signal according to the operation of the LVDS decoder 41 and the timing controller 43.

The video signal and the digital signal (the color signals, the clock signal, the horizontal/vertical synchronous signals) generated from the graphic chip 15 and the A/D converter 18 are transmitted to the LVDS decoder 41 via the LVDS encoder 17. Thus, the LVDS decoder 41 converts the video signal and the digital signal passed through the LVDS encoder 17 into the color (RGB) signals, the clock signal, and the horizontal/vertical synchronous signals, and outputs them to the LCD panel 45 via the timing controller 43.

With this configuration, a process of receiving the CRT video signal from the desktop computer 50 and outputting it to the LCD monitor 40 of the portable computer system 1 will be described hereinbelow.

First, the CRT output port 57 provided at the desktop computer 1 and the CRT input port 7 provided at the portable computer 2 are connected through the cable 60 for a data communication there between. Thus, the CRT video signal generated from the desktop main body 50 is transmitted to the CRT input port 7 of the portable computer 2 through the CRT output port 57.

The CRT video signal transmitted to the CRT input port 7 is transmitted to the A/D converter 18 so as to be displayed on the LCD monitor 40. Then, the A/D converter 18 converts such an analog signal as the CRT video signal into a digital signal including the color (RGB) signals, the clock signal, the horizontal/vertical synchronous signals. The converted digital signal is transmitted to the LCD monitor 40 through the video MUX 30 as the control part.

The video MUX 30 receives a video signal generated from the graphic chip 15 of the portable computer 2, in addition to the digital signal transmitted from the A/D converter 18. Thus, the video MUX 30 transmits the digital signal to the LVDS encoder 17, together with the video signal.

The LVDS encoder 17 digitizes the transmitted video and digital signals again (namely, the color signals, the clock signal, and the horizontal/vertical synchronous signals are reduced in number from twenty to ten), and transmits them to the LCD monitor 40.

Figure 3:
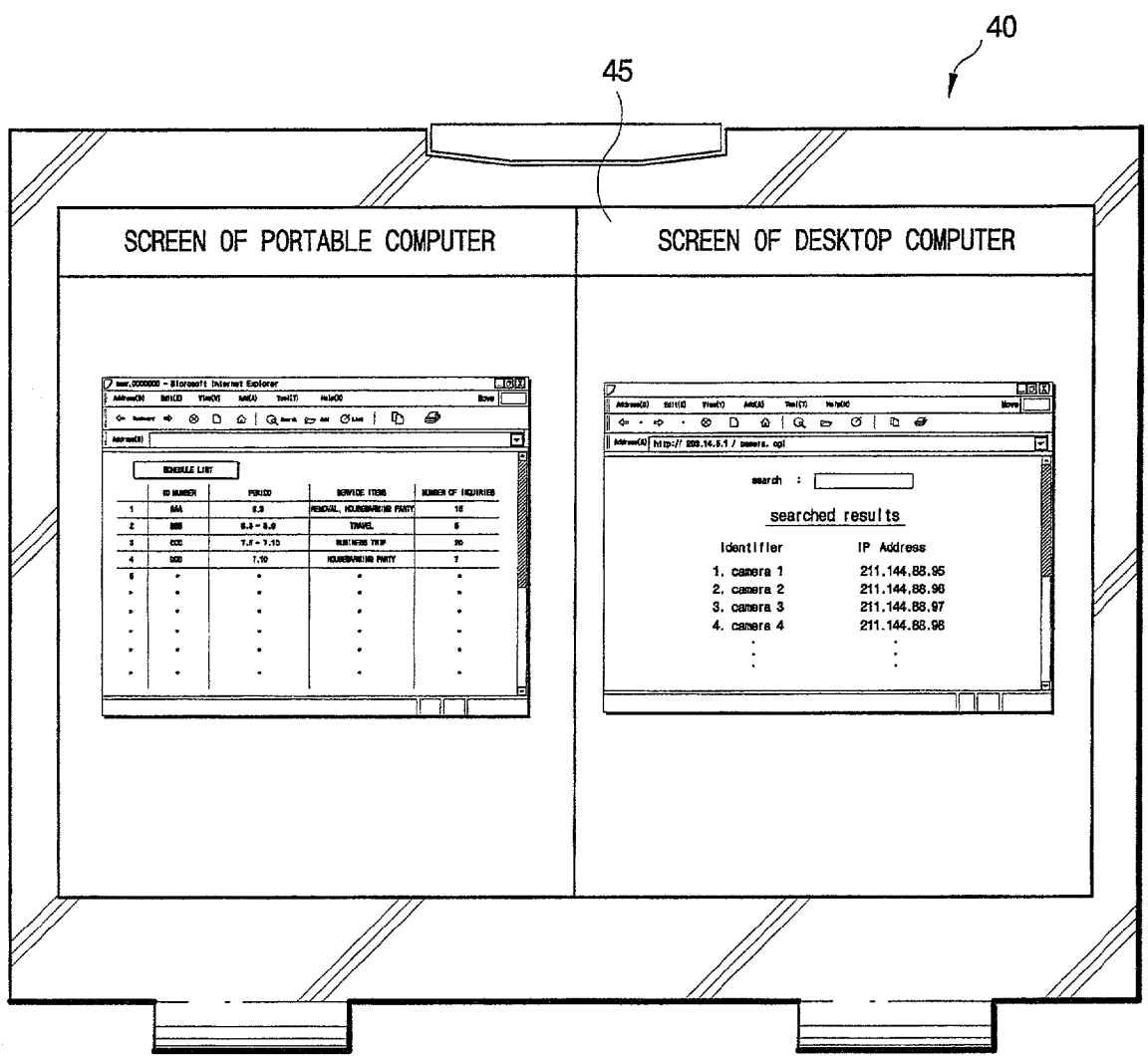
FIG. 3 shows a state of an LCD monitor of the portable computer system according to the present invention, which displays a video signal together with a CRT video signal.

Thereafter, the LVDS decoder 41 provided at the LCD monitor 40 converts the digitized video and digital signals into the video signals which can be displayed on the LCD monitor 40, and outputs them to the LCD panel 45 via the timing controller 43. Thus, the video signal from the portable computer 2 is displayed together with the CRT video signal from the desktop computer 50 on the LCD monitor 40 (see FIG. 3).

Herein, when the video signal is not transmitted from the graphic chip 15, the video MUX 30 outputs only the digital signal by transmitting it from the A/D converter 18 to the LVDS encoder 17.

Figure 2B:
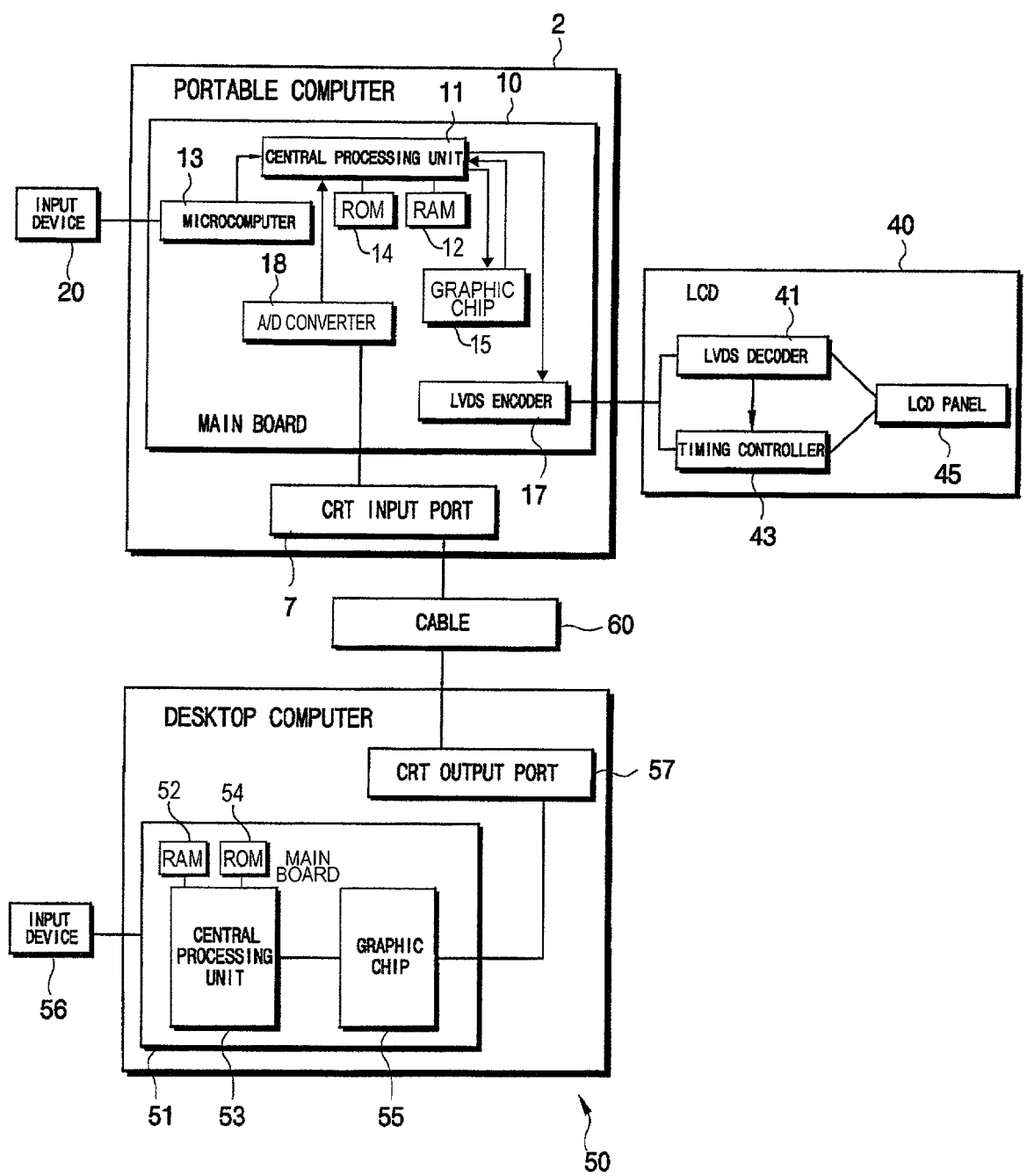

In the above embodiment, the video MUX 30 is mounted on the main board 10 as a chip, and employed as the control part. However, instead of the video MUX 30, software such as an application program may be used as the control part, which can transmit the video signal from the graphic chip 15 and the digital signal from the A/D converter 18 to the LCD monitor simultaneously as seen in FIG. 2B.

Figure 2C:
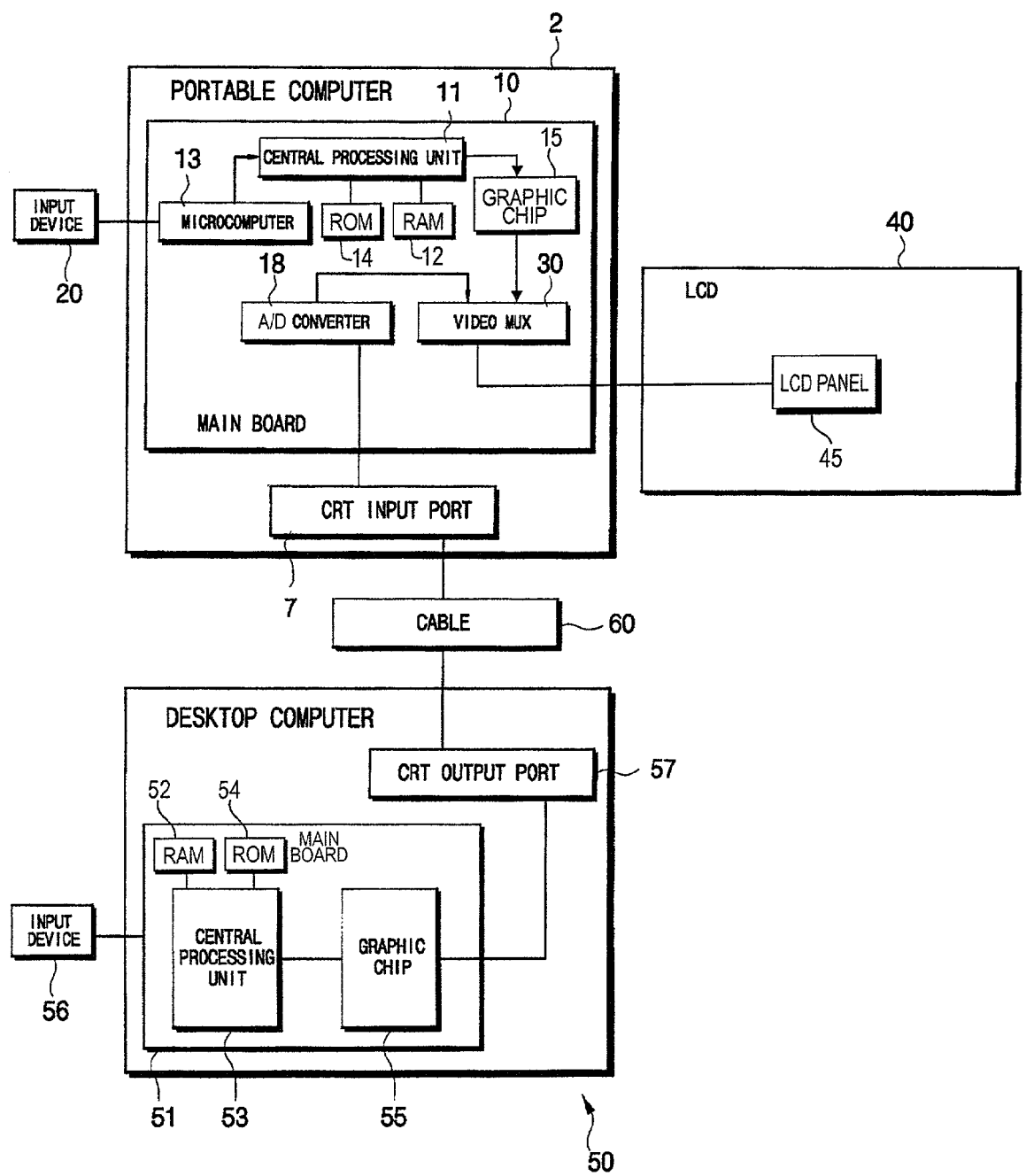

In the above embodiment, the LVDS encoder 17 and the LVDS decoder 41 are respectively provided at the portable computer 2 and the LCD monitor 40. However, the video signal from the graphic chip 15 and the digital signal from the A/D converter 18 may be directly transmitted to the LCD monitor 40 through the control part without the LVDS encoder 17 and the LVDS decoder 41 as seen in FIG. 2C.

In the above embodiment, the video MUX 30 respectively receives the video and digital signals from the graphic chip 15 and the A/D converter 18 and outputs both the video and digital signals to the LCD monitor 40. However, when the video signal is not transmitted from the graphic chip 15, the video MUX 30 may output only the digital signal transmitted from the A/D converter 18 to the LCD monitor 40. Further, when both the video and digital signals are transmitted from the graphic chip 15 and the A/D converter 18, the video MUX 30 may selectively output the video or digital signal according to control of a user.

As described above, in the portable computer are provided the CRT video signal input part (the CRT input port) receiving the external video signal, an A/D converter converting the received external video signal into a digital signal, and the control part outputting the digital signal to the LCD monitor, so that it need not employ an additional monitor for the desktop computer system, thereby enhancing the utility of the LCD monitor, and therefore, a space efficiency. The external video signal from a desktop computer can be a digital signal. In such a case, the A/D converter 18 would not be necessary.

As described above, the present invention provides a portable computer system enhancing the utility of the LCD monitor by receiving an external video signal from an external computer and displaying it on an LCD monitor.

Although the preferred embodiments of the present invention have been disclosed for illustrative purpose, those skilled in the art will appreciate that various modifications, additions and substitutions are possible, without departing from the scope and spirit of the invention as disclosed in the accompanying claims.

What is claimed is:

1. An apparatus, comprising:
    a portable computer including a graphic chip and a liquid crystal display monitor, said liquid crystal display monitor receiving a video signal from the graphic chip and displaying the video signal;
    an external video signal input part provided at the portable computer for receiving an external video signal from an external computer;
    an analog to digital converter provided at the portable computer for converting the external video signal received through the external video signal input part into a digital signal; and
    a control part for controlling the video signal and the digital signal from the graphic chip and the analog to digital converter, respectively, so that it is selectively outputted to the liquid crystal display monitor.

2. The apparatus according to claim 1, further comprising a main board, the graphic chip being mounted on the main board; and
    wherein the control part comprises a video multiplexer provided at the main board.

3. The apparatus according to claim 1, the control part controlling the digital signal from the analog to digital converter so that it is outputted to the liquid crystal display monitor when the video signal is not transmitted from the graphic chip.

4. The apparatus according to claim 2, the control part controlling the digital signal from the analog to digital converter so that it is outputted to the liquid crystal display monitor when the video signal is not transmitted from the graphic chip.

5. The apparatus according to claim 1, the control part outputting, to the liquid crystal display monitor, both the video signal received from the graphic chip and the digital signal received from the analog to digital converter.

6. The apparatus according to claim 2, the control part outputting, to the liquid crystal display monitor, both the video signal received from the graphic chip and the digital signal received from the analog to digital converter.

7. The apparatus according to claim 1, the liquid crystal display monitor being integrated with the portable computer.

8. A display method of a portable computer unit which includes a portable computer equipped with a graphic chip and a liquid crystal display monitor, said liquid crustal display monitor receiving a video signal from the graphic chip and displaying the video signal, said method comprising the steps of:
preparing an external video signal input part at the portable computer;
receiving an external video signal from an external computer through the external video signal input part;
converting the external video signal received through the external video signal input part into a digital signal;
transmitting the digital signal so that it is selectively outputted to the liquid crystal display monitor; and
selectively displaying the digital signal at the liquid crystal display monitor.

9. The display method according to claim 8, the converting step being performed by an analog to digital converter provided at the portable computer.

10. The display method according to claim 8, the transmitting step comprising transmitting both the video signal received from the graphic chip and the digital signal received from the analog to digital converter to the liquid crystal display monitor.

11. The display method according to claim 8, further comprising the steps of:
receiving the video signal from the graphic chip;
transmitting the video signal along with the digital signal for selective output to the liquid crystal display monitor; and
selectively displaying any one of the received video signal, the digital signal, and both the video signal and digital signal at the liquid crystal display monitor.

12. The display method according to claim 8, wherein the transmitting step is performed by a video multiplexer provided at the portable computer.

13. The display method according to claim 9, wherein the transmitting step is performed by a video multiplexer provided at the portable computer.

14. The display method according to claim 10, wherein the transmitting step is performed by a video multiplexer provided at the portable computer.

15. The display method according to claim 11, wherein the transmitting step is performed by a video multiplexer provided at the portable computer.

16. A portable computer, comprising:
a liquid crystal display coupled to a casing including a main board having a central processing unit for processing data, the liquid crystal display accommodating display of a variable video;
an input part for receiving an external video signal from an external computer;
an analog to digital converter for converting the external video signal into a digital signal; and
a control part for controlling the digital signal for selective output to the liquid crystal display.

17. The portable computer of claim 16, further comprising a graphic chip for generating a video signal, the control part controlling the video signal from the graphic chip so that it is selectively outputted to the liquid crystal display.

18. The portable computer of claim 17, the control part comprising a video multiplexer provided on the main board.

19. The portable computer ofclaim 18, further comprising:
a low voltage differential signaling encoder for receiving the video signal and the digital signal from the video multiplexer; and
a low voltage differential signaling decoder for converting the video signal and the digital signal passed through the low voltage differential signaling encoder for display on the liquid crystal display through a timing controller.

20. The portable computer of claim 16, the controller part comprising a program in a memory unit, the program being executed by the central processing unit.

21. The apparatus of claim 1, wherein said portable computer further comprises:
a central processing unit for executing application programs and calculations, said graphic chip generating a video signal according to an operation of said central processing unit;
a microcomputer connected to said central processing unit; and
an input device for entry of data by a user for use by said central processing unit executing application programs and calculations, said microcomputer controlling said input device;
wherein said liquid crystal display monitor is incorporated with said portable computer in one body.

22. The apparatus of claim 21, wherein said portable computer comprises one of a laptop computer, a notebook computer, and a palmtop computer.

23. The apparatus of claim 1, wherein said external video signal input part comprises a cathode ray tube input port, the external video signal being an analog cathode ray tube video signal received through the cathode ray tube input port, the analog to digital converter converting the external video signal to the digital signal so as to accommodate an analog signal to be read and processed at said liquid crystal display monitor.

24. The apparatus of claim 1, wherein said external video signal input part receiving the external video signal comprises an analog signal including a plurality of color signals, a horizontal synchronous signal and a vertical synchronous signal for display.

25. The apparatus of claim 1, wherein said external video signal directly accommodates a display of an image on a display device.

* * * * *